United States Patent Office 3,766,194
Patented Oct. 16, 1973

3,766,194
1-AMINOALKYL-DIBENZO-BICYCLOALKANES
AND THE SALTS THEREOF
Charles Ferdinand Huebner, Chatham, N.J., assignor to
Ciba-Geigy Corporation, Ardsley, N.Y.
No Drawing. Continuation-in-part of application Ser. No.
812,865, Apr. 2, 1969. This application Mar. 12, 1971,
Ser. No. 123,823
Int. Cl. C07c 87/28; C07d 31/36
U.S. Cl. 260—295.5 S          8 Claims

ABSTRACT OF THE DISCLOSURE 1-aminoalkyl-dibenzobicycloalkanes, e.g. those of the formula

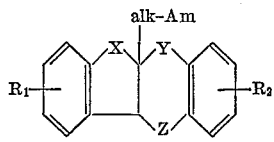

Am = an amino group
alk = alkylene
X = methylene, hydroxy- or alkoxymethylene
one of
  Y+Z=X, other direct bond
  $R_{1,2}$ = H or alkyl,
N-oxides and salts thereof are antidepressants.

CROSS-REFERENCES TO RELATED APPLICATIONS

This is a continuation-in-part of application Ser. No. 812,865, filed Apr. 2, 1969 (now Pat. No. 3,689,676).

SUMMARY OF THE INVENTION

The present invention concerns and has for its object the provision of new 1-aminoalkyl-dibenzobicycloalkanes, preferably of those having Formula I

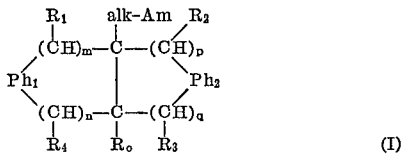

in which each of $Ph_1$ and $Ph_2$ is a 1,2-phenylene radical, alk is lower alkylene, Am is a primary, secondary or tertiary amino group, $R_0$ is hydrogen or lower alkyl, each of $R_1$, $R_2$, $R_3$ and $R_4$ is hydrogen or one or two thereof are hydroxy or lower alkoxy and the others are hydrogen, and each of $m$, $n$, $o$ and $p$ is the integer 1, or one of $m$ and $n$ as well as of $p$ and $q$ is the integer 0 and the others are the integer 1, of N-oxides and salts thereof, as well as of corresponding pharmaceutical compositions and of methods for the preparation and application of these products. Said compositions are useful antidepressants, for example, in the treatment or management of exo- or endogenous depressions.

DESCRIPTION OF THE PREFERRED EMBODIMENT

The 1,2-phenylene radicals $Ph_1$ and $Ph_2$ are unsubstituted or substituted in the remaining 4 positions by one or more than one, preferably one or two, of the same or different substituents, for example, lower alkyl, e.g. methyl, ethyl, n- or i-propyl or -butyl groups. More particularly, the radicals $Ph_1$ and $Ph_2$ represent R-1,2-phenylene, wherein R is hydrogen. The term "lower," referred to above and hereinafter in connection with organic radicals or compounds, respectively, defines such with up to 7, preferably up to 4, carbon atoms.

$R_0$ preferably represents hydrogen, but also one of the above-mentioned lower alkyl groups, above all methyl.

A lower alkoxy group $R_1$, $R_2$, $R_3$ or $R_4$ is preferably methoxy, but also one of the other above-mentioned alkoxy groups.

The lower alkylene radical alk is preferably methylene or 1,2-ethylene, but also 1,1-ethylene, 1,1-, 1,2-, 2,2- or 1,3-propylene, 1,1-, 1,2-, 2,2-, 1,2-, 2,3- or 1,4-butylene.

The amino group Am is a primary, preferably a secondary, but especially a tertiary amino group, for example, mono- or di-lower alkylamino, e.g. methylamino, ethylamino, n- or i-propylamino, dimethylamino, N-methyl-N-ethylamino, diethylamino, di-n- or i-propylamino or di-n-butylamino.

The compounds of the invention exhibit valuable pharmacological properties, for example, imipramine-type antidepressant effects. This can be demonstrated in animal tests, using advantageously mammals, such as mice or rats, as test objects. The compounds of the invention can be applied to the animals orally, subcutaneously or intraperitoneally, e.g. in the form of aqueous solutions or suspensions. The dosage may range between about 1 and 150 mg./kg./day, preferably between about 5 and 50 mg./kg./day, advantageously between about 10 and 25 mg./kg./day. A depressant effect can be observed in the mice jiggle test system, at oral doses between about 30 and 150 mg./kg., where the spontaneous movements of the animals are recorded. An antidepressant activity can be observed in mice, for example, via the reversal of reserpine hypothermia at oral doses of about 15–25 mg./kg., or via the potentiation of amphetamine in rats at intraperitoneal doses of about 5–25 mg./kg. Said tests can be performed, for example, according to Pletscher Ann. N.Y. Acad. Sci. 80, 1039 (1959), Maxwell et al., Nature 191, 84 (1961) or Carlton, Psychopharmacologia 1961, vol. II, 364. Accordingly, the compounds of the invention are useful antidepressants, but also useful as intermediates in the preparation of other valuable products, especially of pharmacologically active compounds.

Particularly useful are the compounds of Formula I, in which each of $Ph_1$ and $Ph_2$ is R-1,2-phenylene, alk is lower alkylene, Am is amino, mono- or di-lower alkylamino, each of R and $R_0$ is hydrogen or lower alkyl, each of $R_1$, $R_2$, $R_3$ and $R_4$ is hydrogen or one or two thereof are hydroxy or lower alkoxy and the others are hydrogen, one of $m$ and $n$ as well as of $p$ and $q$ is the integer 1, and the other of both is the integer 0, and the N-oxide, or therapeutically useful acid addition salts thereof.

Preferred compounds of the invention are those of Formula II

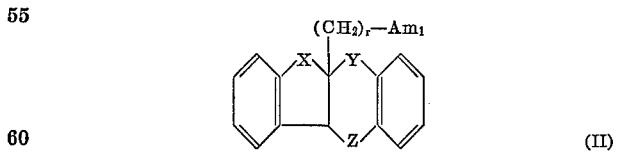

in which $Am_1$ is mono- or di-lower alkylamino or lower alkyleneimino, $r$ is the integer 1 or 2, X is methylene, hydroxy- or methoxymethylene and one of Y and Z is X and the other a direct bond or therapeutically acceptable acid addition salts thereof.

Especially valuable are the compounds of Formula II, in which $Am_1$ is methylamino, ethylamino, dimethylamino or diethylamino, $r$ is the integer 1 or 2, each of X and Y are methylene and Z is a direct bond, or therapeutically acceptable acid addition salts thereof.

The compounds of this invention are prepared according to methods known per se. For example, they are obtained by:

(a) converting in a compound of the formula

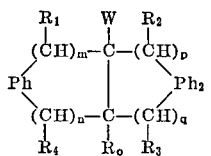

in which W is a substituent capable of being converted into alk-Am, W into said aminoalkyl group or (b) reducing in a compound of the formula

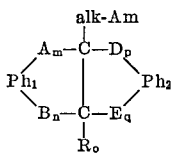

or a functional derivative thereof, in which one or two of A, B, D and E are carbonyl and the others are methylene, said carbonyl to methylene or hydroxymethylene or (c) opening in a compound of the formula

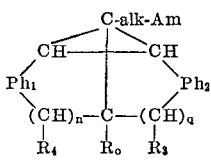

the cyclopropane ring hydrolytically, reductively or oxidatively and, if desired, converting any resulting compound into another compound of the invention.

The substituent W is, for example, a reactively esterified hydroxyalkyl group, for example, such derived from a strong mineral acid, particularly a hydrohalic acid, e.g. hydrochloric or hydrobromic acid, a sulfuric or sulfonic acid, such as a lower alkane or benzene sulfonic acid, e.g. methane, ethane or p-toluene sulfonic acid, or a phosphoniumalkyl group, e.g. a triphenylphosphoniumalkyl halide group. Said groups are converted into aminoalkyl by condensation with H-Am, or an alkali metal, e.g. sodium salt thereof.

Another substituent W, is, for example, a (nitro, oximino, imino, cyano, carbamoyl, isocyanato or esterified carboxyamino, e.g. carbalkoxyamino)-alkyl, -alkenyl, -alkanoyl or -hydroxyalkyl group, an aminoalkenyl, -alkanoyl or -hydroxyalkyl group, cyano or preferably carbamoyl, e.g. COAm, which radicals can be converted into aminoalkyl by reduction and/or hydrolysis. The above nitro compounds, nitriles, amides, isocyanates, urethanes or alkanoyl compounds are advantageously reduced with the use of simple or complex light metal hydrides, e.g. boron hydride or alkali metal boron or aluminum hydrides, such as lithium aluminum hydride or sodium boron hydride. In this reduction, the cyano and carbamoyl groups are converted into aminomethyl groups, the isocyanato or esterified carboxyamino groups into methylamino groups and the alkanoyl groups into alkyl or $\alpha$-hydroxyalkyl groups. Said oximes, Schiff's bases (i.e. iminoalkyl- or aminohydroxyalkyl compounds) or said $\omega$-amino-$\alpha$-hydroxyalkyl reduction products of the alkanoyl compounds, as well as the nitro compounds and aminoalkenyl compounds, are preferably reduced with nascent hydrogen, such as hydrogen generated electrolytically or by the action of metals on acids or alcohols, e.g. zinc or iron and mineral or alkanoic acids, sodium or aluminum or their amalgams and lower alkanols. Also, catalytic reduction may be applied, i.e. hydrogen in the presence of nickel, reduction may be applied, i.e. hydrogen in the presence of nickel, palladium or platinum catalysts. Isocyanates and urethanes may also be subjected to hydrolysis, e.g. with the use of aqueous mineral acids or alkalies.

The reduction according to item (b) is similarly performed as that described for the above carbonyl compounds, i.e. with the use of simple or complex light metal hydrides, in order to obtain compounds of Formula I, wherein one or two of $R_1$, $R_2$, $R_3$ and $R_4$ are hydroxy, or with the use of catalytically activated or nascent hydrogen, in order to obtain compounds of Formula I, wherein each of $R_1$ to $R_4$ is hydrogen. Functional derivatives of said ketones are, for example, thioketals, e.g. ethylenedithioketals, which are advantageously reduced under desulfurization conditions, for example with Raney nickel in ethanol, as well as hydrazones or semicarbazones which can be decomposed according to Wolff-Kishner with alkalies, e.g., alkali metal hydroxides, advantageously potassium hydroxide.

The ring-opening procedure according to item (c) can be performed hydrolytically, e.g. with the use of strong aqueous mineral acids, such as hydrohalic acids, which results in compounds of Formula I, wherein one of $R_1$ and $R_2$ is hydroxy. The reductive ring-opening can be performed with the use of a reactive metal and a hydrogen donor, e.g. an alkali metal and ammonia, to yield compounds of Formula I, wherein both of $R_1$ and $R_2$ are hydrogen. The oxidative ring-opening process can be performed with the use of halogens, e.g. bromine, and hydrolysing or alcoholizing the resulting dihalo compounds according to methods known per se, for example with the use of water or lower alkanols in the presence of bases, e.g. alkali or alkaline earth metal carbonates.

The compounds of the invention so obtained can be converted into each other according to methods known per se. For example, resulting primary, secondary or tertiary amines can be reacted with reactive esters of the corresponding alcohols, or with aldehydes or ketones and reducing agents, e.g. formic acid or its functional derivatives or nascent hydrogen, in order to obtain secondary or tertiary amines. Resulting primary or secondary amines can also be acylated, for example, with the use of the corresponding acid halides or anhydrides, or acyl derivatives obtained hydrolyzed, e.g. with acids or alkalies, or reduced with simple or complex light metal hydrides. Furthermore, nitro groups may be introduced into aromatic moieties, e.g. by the action of nitric-sulfuric acid or by pyrolysis of nitrates, advantageously in acidic media, e.g. trifluoroacetic acid, or nitro. Resulting tertiary amines can be converted into N-oxides, e.g. by reaction with oxidizing agents, such as hydrogen peroxide or peracids, e.g. aliphatic or aromatic percarboxylic acids.

A resulting basic compound can also be converted into a corresponding acid addition salt, for example by reacting it with an inorganic or organic acid, such as a therapeutically useful acid, or with a corresponding anion exchange preparation, and isolating the desired salt. An acid addition salt may be converted into the free compound by treatment with a base, e.g. a metal hydroxide, ammonia or a hydroxyl ion exchange preparation. Therapeutically useful acids are, for example, inorganic acids, e.g. hydrochloric, hydrobromic, sulfuric, phosphoric, nitric or perchloric acid, or organic acids, e.g. caboxylic or sulfonic acids, such as formic, acetic, propionic, succinic, glycolic, lactic, maleic, tartaric, citric, ascorbic, maleic, hydroxymaleic, pyroracemic, phenylacetic, benzoic, 4-aminobenzoic, anthranilic, 4-hydroxy-benzoic, salicylic, aminosalicylic, embonic, nicotinic, methanesulfonic, ethanesulfonic, hydroxyethanesulfonic, ethylenesulfonic, halogenbenzenesulfonic, toluenesulfonic, naphthalenesulfonic, sulfanilic and cyclohexylsulfamic acid; methionine, tryptophan, lysine and arginine.

These or other salts, for example, the picrate, can also be used for purification of the resulting free compounds, which are converted into salts, the salts separated and the free compounds liberated from the salts. In view of the close relationship between the free compounds and the compounds in the form of their salts, whenever a compound is referred to in this context, a corresponding salt is also intended, provided such is possible or appropriate under the circumstances.

Resulting mixtures of isomers can be separated into the single isomers by methods in themselves known, e.g. by fractional distillation, crystallization and/or chromatography. Racemic products can likewise be resolved into the optical antipodes, for example by separation of diastereomeric salts thereof, e.g. by the fractional crystallization of d- or l-tartrates.

The above reactions are carried out according to standard methods, in the presence or absence of diluents, preferably such as are inert to the reagents and are solvents thereof, of catalysts, condensing, neutralizing agents and/or inert atmospheres, at low temperatures, room temperature or elevated temperatures, at atmospheric or superatmospheric pressure.

The invention also comprises any modification of the above process, wherein a compound resulting as an intermediate at any stage thereof, is used as starting material and the remaining steps are carried out or the process is discontinued at any stage thereof, or in which the starting material is formed under the reaction conditions or is used in the form of its salts or reactive derivatives. Those starting materials are preferably used, which lead to those compounds of the invention, which are indicated above as the preferred embodiments of the invention.

The starting material used is known or, if new, may be prepared according to methods known per se. For example, starting material mentioned under item (a) can be prepared by reacting an anthracene with the compound R—C≡C—W, wherein W preferably is an esterified carboxyl group, for example, according to Vaugh et al., J. Am. Chem. Soc. 74, 5623 (1952). The Diels-Alder adduct obtained can be irradiated analogous to the reactions described in J. Am. Chem. Soc. 88 2882 (1966) and 90 4465, preferably with light having λ >300 A. and/or in the presence of photosensitizers, preferably ketonic sensitizers, e.g. acetone, acetophenone or benzophenone, to yield corresponding -W dibenzosemibullvalene, anlogous to those shown under item (c), wherein each of $n$ and $q$ is the integer 0. In said semibullvalenes W can be converted analogous to the reaction (a) into alk-Am, to yield the starting material mentioned under item (c). Alternatively, the cyclopropane ring of said 1-W-dibenzosemibullvalenes can be opened as shown under item (c). The compounds so obtained can then be converted into the other starting materials as described for the final products of the invention. For example, resulting esters can be hydrolyzed or transesterified in the presence of acidic or alkaline agents, e.g. mineral or complex heavy metal acids or alkali metal carbonates or alcoholates, or treated with H-Am. Resulting acids can be converted into their halides by treatment with thionyl or oxalyl halides or phosphorus halides or oxyhalides. Resulting acid halides may be treated with alcohols, ammonia or amines and resulting metal or ammonium salts with aliphatic or araliphatic halides or chlorosulfites, thionyl halides, phosphorus oxide, halides or oxyhalides or other acyl halides as well as alkali metal cyanides, in order to obtain the corresponding esters, halides, anhydrides, amides or the nitrile respectively. Resulting amides can be hydrolyzed under acidic or alkaline conditions, e.g. with the use of aqueous mineral and/or carboxylic acids or alkali metal hydroxides, also alcoholized or transaminated. A resulting ester, salt or nitrile, containing in α-position at least one hydrogen atom, can be metallized in said α-position, e.g. with the use of alkali metals or reactive derivatives thereof, e.g. organic metal compounds, such as phenyl or butyl lithium, triphenylmethyl sodium or sodium hydride, amides or alcoholates, and thereupon reacted with ethylene oxide, a reactive ester of a corresponding alcohol or a corresponding functional acid derivative, e.g. an unsubstituted or correspondingly substituted lower alkyl or alkanoyl halide. Starting material in which X contains more than one carbon atom can be obtained from that in which X is halomethyl according to the Wittig reaction to yield said phosphonium compounds. Readily available compounds in which X is acetyl, can be converted into corresponding amides according to the Willgerodt-Kindler reaction or may be halogenated and aminated in order to yield the compounds in which X is Am-acetyl. Compounds in which X is formyl, can be reacted with nitromethane to yield corresponding 2-nitroethenyl compounds.

The starting material mentioned under item (b) can be obtained from corresponding ketones lacking the alk-Am moiety, e.g. those described in J. Org. Chem. 23, 1538 (1958). These can be reacted according to the aldol condensation or Mannich reaction with formaldehyde or a reactive derivative thereof, in the absence or presence of H-Am, to yield the desired ketones containing the angular hydroxy- or aminomethyl group. The former can be converted into aminoalkyl as described above. Furthermore, a diphenylalkyl halogenide can be reacted with a sodium malonate, to yield the α-diphenylalkyl-malonate which is hydrolyzed and reacted with formaldehyde or its derivatives as shown above, to yield compounds of the type

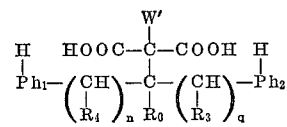

wherein W' is HO— or Am-methyl, which latter compounds can be cyclized with the aid of polyphosphoric acid and in the resulting diketones W' converted into aminoalkyl as shown above.

The pharmacologically active compounds of the invention are useful in the manufacture of pharmaceutical compositions comprising an effective amount thereof in conjunction or admixture with excipients suitable for either enteral, parenteral or topical application. Preferred are tablets and gelatin capsules comprising the active ingredient together with (a) diluents, e.g. lactose, dextrose, sucrose, mannitol, sorbitol, cellulose and/or glycine, (b) lubricants, e.g. silica, talcum, stearic acid, its magnesium or calcium salt and/or polyethyleneglycol, for tablets also (c) binders, e.g. magnesium aluminum silicate, starch paste, gelatin, tragacanth, methylcellulose, sodium carboxymethylcellulose and/or polyvinylpyrrolidone, if desired, (d) disintegrants, e.g. starches, agar, alginic acid or its sodium salt, enzymes of the binders or effervescent mixtures and/or (e) adsorbents, colorants, flavors and sweeteners. Injectable compositions are preferably aqueous isotonic solutions or suspensions, and suppositories or ointments are advantageously fatty emulsions or suspensions. They may be sterilized and/or contain adjuvants, such as preserving, stabilizing, wetting or emulsifying agents, solution promoters, salts for regulating the osmotic pressure and/or buffers. Said pharmaceutical compositions may also contain other therapeutically valuable substances. They are prepared accordinng to conventional mixing, graulating or coating methods respectively and contain about 0.1 to 75%, preferably about 1 to 50%, of the active ingredient.

The following examples are intended to illustrate the invention and are not to be construed as being limitations thereon. Temperatures are given in degrees centigrade, and all parts wherever given are parts by weight.

Example 1

The solution of 3.8 g. 9a-dimethylcarbamoyl-4b,9,9a,10-tetrahydro-indeno[1,2-a]indene in 100 ml. tetrahydrofuran is added dropwise to the stirred mixture of 1 g. lithium aluminum hydride and 25 ml. diethyl ether. The mixture is refluxed for 6 hours, cooled with ice, and 1 ml. water, 2 ml. 25% aqueous sodium hydroxide and 3 ml. water are added in this succession. It is filtered, the filtrate evaporated in vacuo, the residue taken up in the minimum amounts of ethanol, the solution acidified with ethanolic hydrogen chloride and diluted with diethyl ether, to yield the 9a - dimethylaminomethyl - 4b,9,9a,10-tetrahydro- indeno[1,2-a]indene hydrochloride of the formula

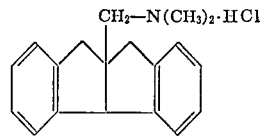

It loses solvent of crystallization at about 170–180°, resolidifies and finally melts at 230–235°.

The starting material can be prepared as follows: The mixture of 40 g. anthracene, 22 g. ethyl propiolate and 150 ml. xylene is refluxed for 7 days. After cooling, it is filtered, the residue washed with acetonitrile and the filtrate evaporated in vacuo. The residue is rcrystallized from ethanol, to yield the 11-carbethoxy-9,10-etenoanthracene melting at 108–110°.

The mixture of 30 g. thereof, 100 ml. 18% aqueous sodium hydroxide and 40 ml. methanol is refluxed for 3 hours and evaporated in vacuo. The residue is dissolved in hot water, the solution filtered and the cold filtrate acidified with 15% aqueous hydrochloric acid. The precipitate formed is filtered off and recrystallized from acetonitrile, to yield the corresponding free acid melting at 250°.

The solution of 10 g. thereof in 250 ml. tetrahydrofuran is irradiated by a low-pressure ultraviolet lamp until no starting material can be detected by NMR-analysis. It is evaporated and the residue recrystallized from ethanol, to yield the 1-carboxydibenzosemibullvalene melting at 230–232°.

To the mixture of 2 g. thereof and 50 ml. methanol, 0.44 g. sodium methoxide are added while stirring. It is evaporated in vacuo, the residue finely powdered and added to the fresh mixture of 200 ml. liquid ammonia and 0.5 g. sodium while stirring. After stirring for 15 minutes, the excess of sodium is converted into sodium amide by the addition of 50 mg. ferric nitrate nonahydrate. The mixture is allowed to evaporate, the residue taken up in water, the solution acidified with hydrochloric acid, the precipitate formed filtered off and recrystallized from ethanol, to yield the 9a-carboxy-4b,9,9a,10-tetrahydro-indeno[1,2-a]indene melting at 192°.

The mixture of 1 g. thereof and 5 ml. thionyl chloride is allowed to stand at room temperature overnight and evaporated in vacuo. The residue is taken up in 5 ml. benzene and the solution combined with 3 ml. 4 N dimethylamine in ethyl acetate while cooling and stirring. After 30 minutes, the mixture is evaporated in vacuo, the residue triturated with water and recrystallized from methanol, to yield the 9a-dimethylcarbamoyl-4b,9,9a,10-tetrahydroindeno[1,2-a]indene melting at 165°.

Example 2

The solution of 3.9 g. 9a-methylcarbamoyl-4b,9,9a,10-tetrahydro-indenol[1,2-a]indene in 100 ml. tetrahydrofuran is added dropwise to the stirred suspension of 1 g. lithium aluminum hydride in 30 ml. diethyl ether. The mixture is refluxed for 12 hours, cooled and a few drops ethyl acetate, 1 ml. water, 2 ml. 12% aqueous sodium hydroxide and 3 ml. water are added in this order. It is filtered, the filtrate evaporated in vacuo, the residue taken up in the minimum amount of ethanol, the solution acidified with ethanolic hydrogen chloride, the precipitate formed filtered off and recrystallized from ethanol-diethyl ether, to yield the 9a-methylaminomethyl-4b,9,9a,10-tetrahydro-indeno[1,2-a]indene hydrochloride of the formula

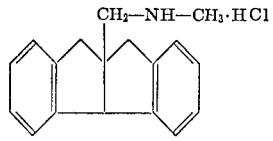

melting at 265°.

The starting material is prepared as follows: The mixture of 5 g. 9a-carboxy-4b,9,9a,10-tetrahydro-indeno[1,2-a]indene and 50 ml. thionyl chloride is allowed to stand at room temperature overnight and evaporated in vacuo. The residue is taken up in the minimum amount of benzene and the solution again evaporated in vacuo. The residue is taken up in 100 ml. benzene and methylamine is bubbled through the solution until it stays basic. It is filtered, the filtrate evaporated in vacuo, the residue washed with water and recrystallized from ethanol, to yield the 9a-methylcarbamoyl - 4b,9,9a,10 - tetrahydro - indeno[1,2-a]indene melting at 156–158°.

Example 3

The mixture of 1 g. 9,10-dioxo-9a-dimethylaminomethyl-4b,9,9a,10-tetrahydro-indeno[1,2-a]indene, 10 ml. ethanol and 0.1 g. 10% palladium on charcoal is hydrogenated at 3.4 hrs. until the theoretical amount of hydrogen has been absorbed. It is filtered, the residue washed with hot ethanol, the filtrate concentrated, acidified with ethanolic hydrogen chloride and diluted with diethyl ether, to yield the 9a-dimethylaminomethyl-4b,9,9a,10-tetrahydro-indeno[1,2-a]indene hydrochloride melting at 232–234°; it is identical with that obtained according to Example 1.

The starting material is prepared as follows: The mixture of 11.7 g. 9,10-dioxo-4b,9,9a,10-tetrahydro-indeno[1,2-a]indene, 11.5 ml. 37% aqueous formaldehyde, 12 ml. 5 N ethanolic dimethylamine and 25 ml. ethanol is slowly heated and refluxed for 4 hours. It is evaporated, the residue taken up in diethyl ether, the solution extracted, with 5% aqueous hydrochloric acid and the aqueous layer made basic with ammonia. It is extracted with diethyl ether, the extract washed with water, dried, filtered and evaporated, to yield the 9,10-dioxo-9a-dimethylaminomethyl-4b,9,9a,10-tetrahydro-indeno[1,2-a]indene.

Example 4

The mixture of 3 g. of the bis-ethylenedithio ketal of 9,10-dioxo-9a-dimethylaminomethyl-4b,9,9a,10 - tetrahydro-indeno[1,2-a]indene, 100 ml. ethanol and 20 g. Raney nickel is refluxed for 24 hours, filtered and the filtrate evaporated in vacuo. The residue is taken up in the minimum amount of ethanol, the solution acidified with ethanolic hydrogen chloride and diluted with diethyl ether, to yield the 9a-dimethylaminomethyl-4b,9,9a,10-tetrahydro-indeno[1,2-a]indene hydrochloride, melting at 230–235°; it is identical with the product obtained according to Example 1.

The starting material is prepared as follows: The solution of 2.9 g. 9,10-dioxo-9a-dimethylaminomethyl-4b,9,9a,10-tetrahydro-indeno[1,2-a]indene in 10 ml. hot acetic acid is treated with 6 ml. ethylenedithio glycol followed by the addition of 5 ml. boron trifluoride etherate, and the mixture is allowed to stand for 3 days at room temperature. It is combined with 1.7 ml. 6 N ethanolic hydrogen chloride, diluted with diethyl ether and the precipitate formed filtered off. It is taken up in water, the solution made basic with ammonia and extracted with diethyl ether. The extract is washed with water, dried and evaporated, to yield the desired bis-ethylenedithio ketal.

Example 5

To the mixture of 5 g. 9a-bromomethyl-4b,9,9a,10-tetrahydro-indeno[1,2-a]indene and 10 ml. benzene, 12 ml. 0.6 molar ethanolic dimethylamine are added and the mixture heated in a sealed tube to 100° for 12 hours. It is evaporated in vacuo, the residue taken up in ammonia and the mixture extracted with diethyl ether. The extract is shaken with 5% aqueous hydrochloric acid, the aqueous layer made basic with ammonia and extracted with diethyl ether. The extract is dried, filtered, evaporated, the residue taken up in ethanol, the solution acidified with ethanolic hydrogen chloride and diluted with diethyl ether, to yield the 9a-dimethylaminomethyl-4b,9,9a,10-tetrahydro-indeno[1,2-a]indene hydrochloride melting at 230–

235°; it is identical with the product obtained according to Example 1.

The starting material is prepared as follows: The mixture of 11.7 g. 9,10-dioxo-4b,9,9a,10-tetrahydro-indeno-1,2-a]indene, 1.6 g. paraformaldehyde, 0.3 g. potassium carbonate and 100 ml. methanol is stirred for 14 hours at room temperature. It is diluted with water, the precipitate formed filtered off and dissolved in 100 ml. ethanol. The solution is hydrogenated over 2 g. 10% palladium on charcoal at 3.4 hrs. until 4 mol equivalents of hydrogen have been consumed. It is filtered, the residue washed with hot ethanol and the filtrate evaporated, to yield the 9a-hydroxymethyl-4b,9,9a,10-tetrahydro-indeno-[1,2-a]indene.

To the solution of 5 g. thereof in 100 ml. anhydrous diethyl ether, 0.67 ml. phosphorus tribromide are slowly added while stirring and cooling in a Dry Ice-ethanol bath. The mixture is allowed to warm up to room temperature overnight, poured onto ice and the mixture stirred for 1 hour. The organic solution is separated, washed with water and aqueous sodium bicarbonate, dried, filtered and evaporated in vacuo, to yield the 9a-bromomethyl-4b,9,9a,10-tetrahydro-indeno[1,2-a]indene, which is used as such without further purification.

Example 6

To the mixture of 1 g. 9a-cyanomethyl-4b,9,9a,10-tetrahydro-indeno[1,2-a]indene in 25 ml. tetrahydrofuran, 0.3 g. lithium aluminum hydride in 10 ml. diethyl ether are added while stirring and the mixture refluxed overnight. It is cooled, 0.3 ml. water, 0.6 ml. 12% aqueous sodium hydroxide and 1 ml. water are added, the mixture filtered and the filtrate evaporated in vacuo, to yield the 9a-(2-aminoethyl)-4b,9,9a,10-tetrahydro-indeno[1,2-a]indene of the formula

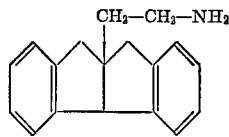

showing in the I.R. spectrum bands at 695, 1502 and 1590 cm.$^{-1}$.

The starting material is prepared as follows: The solution of 3.9 g. 9a-carboxy-4b,9,9a,10-tetrahydro-indeno[1,2-a]indene in 75 ml. tetrahydrofuran is added dropwise to the mixture of 1 g. lithium aluminum hydride in 20 ml. diethyl ether while stirring. After refluxing for 8 hours, the mixture is cooled, 8 ml. ethyl acetate, 1 ml. water, 2 ml. 12% aqueous sodium hydroxide and 3 ml. water are added, the mixture filtered, the residue washed with diethyl ether and the filtrate is evaporated in vacuo, to yield the 9a-hydroxymethyl-4b,9,9a,10-tetrahydro-indeno[1,2-a]indene. To the solution of 3.2 g. thereof in 6 ml. pyridine, 3.4 g. 4-bromobenzenesulfonyl chloride are added while stirring and the mixture allowed to stand overnight, at room temperature. It is poured onto ice water, extracted with chloroform and the extract washed with 5% hydrochloric acid and water, It is dried, evaporated and the residue recrystallized from methanol-acetone, to yield the corresponding 4-bromobenzenesulfonate, melting at 120° C.

The mixture of 1.2 g. thereof, 0.2 g. sodium cyanide and 5 ml. dimethylformamide is heated at the steam cone for 6 hours while stirring. It is cooled, diluted with water, extracted with chloroform, the extract dried and evaporated, to yield the 9a-cyanomethyl-4b,9,9a,10-tetrahydro-indeno[1,2-a]indene.

Example 7

The mixture of 0.9 g. 9a-(2-aminoethyl)-4b,9,9a,10-tetrahydro-indeno[1,2-a]indene, 0.92 ml. 36% aqueous formaldehyde, 0.67 ml. formic acid and 5 ml. isopropanol is refluxed for 24 hours and evaporated in vacuo. The residue is taken up in 5% aqueous sodium hydroxide, the mixture extracted with diethyl ether, the extract dried, filtered and evaporated. The residue is taken up in ethanol, the solution acidified with ethanolic hydrogen chloride, the precipitate formed recovered and recrystallized from methanol, to yield the 9a-(2-dimethylaminoethyl)-4b,9,9a,10-tetrahydro-indeno[1,2-a]indene hydrochloride of the formula

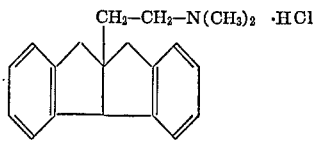

melting at 260° with decomposition.

Example 8

The mixture of 5 g. 1-methylaminomethyl-dibenzosemibullvalene hyrochloride and 200 ml. N-hydrochloric acid is refluxed for 12 days under nitrogen. After cooling, it is made basic with ammonia, extracted with diethyl ether, the extract washed, dried, evaporated and the residue recrystallized from ethanol, to yield the 9-hydroxy-9a-methylaminomethyl - 4b,9,9a,10 -tetrahydro - indeno-[1,2-a]indene of the formula

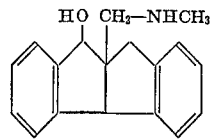

melting at 138–142°; its hydrochloride melts at 260° after recrystallization from ethanol-diethyl ether.

The starting material is prepared as follows: The mixture of 75 g. 1-carboxy-dibenzosemibullvalene and 500 ml. thionyl chloride is allowed to stand overnight at room temperature and evaporated in vacuo. The residue is taken up in 100 ml. benzene and the mixture again evaporated in vacuo. The residual dibenzosemibullvalene-1-carboxylic acid chloride is taken up in 2 liters ethyl acetate and 365 ml. 4 N methylamine in ethyl acetate are added dropwise while cooling and stirring. The mixture is allowed to stand at room temperature for 3 hours, washed with water, 5% hydrochloric acid and again water and evaporated in vacuo. The residue is recrystallized from ethanol, to yield the 1-methylcarbamoyl-dibenzosemibullvalene melting at 182–184°.

The solution of 68.5 g. thereof in 1 liter tetrahydrofuran is added dropwise to the mixture of 17 g. lithium aluminum hydride and 100 ml. diethyl ether while stirring and refluxing. After 6½ hours the mixture is cooled, 17 ml. water are added dropwise, followed by 34 ml. 12% aqueous sodium hydroxide and 51 ml. water. The mixture is filtered, the filtrate evaporated in vacuo, the residue taken up in the minimum amount of ethanol and the solution acidified with ethanolic hydrochloric acid. The precipitate formed is filtered off and recrystallized from ethanol, to yield the 1-methylaminomethyl-dibenzosemibullvalene hydrochloride, melting at 264–265° with decomposition.

Example 9

The mixture of 2 g. 9-hydroxy-9a-methylaminomethyl-4b,9,9a,10-tetrahydro-indeno[1,2-a]indene, 18 ml. propanol, 1.45 ml. 98% formic acid and 1.7 ml. 37% aqueous formaldehyde is refluxed overnight and evaporated. The residue is taken up in water, the solution made basic with ammonia and extracted with diethyl ether. The extract is washed with water, dried, evaporated and the residue recrystallized from isopropanol, to yield the 9-hydroxy-9a- di-methylaminomethyl - 4b,9,9a,10 - tetrahydro - indeno [1,2-a]indene of the formula

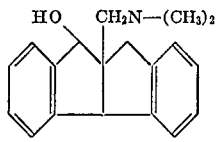

melting at 128°; its hydrobromide melts at 222–225° after recrystallization from isopropanol.

Example 10

The solution of 3.9 g. 9,10-dimethoxy-9a-dimethylcarbamoyl - 4b,9,9a,10 - tetrahydro-indolino[1,2-a]indene in 75 ml. tetrahydrofuran is added dropwise to the mixture of 1 g. lithium aluminum hydride and 20 ml. diethyl ether while stirring. After refluxing overnight and cooling, 1 ml. water, 2 ml. 12% aqueous sodium hydroxide and 3 ml. water are added, the mixture filtered and the filtrate evaporated in vacuo. The residue is taken up in diethyl ether, the solution extracted with 5% hydrochloric acid, the extract made basic with ammonia and again extracted with diethyl ether. The extract is dried, evaporated and the residue recrystallized from isopropanol, to yield the 9,10-dimethoxy-9a - dimethylaminomethyl - 4a,9 9a,10-tetrahydro-indeno[1,2-a]indene of the formula

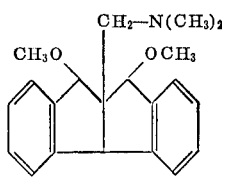

melting at 93–95°.

The starting material is prepared as follows: To the solution of 2 g. 1-carboxy-dibenzosemibullvalene in 100 ml. ethyl acetate, 14.2 ml. of 2 N bromine in carbon tetrachloride are added dropwise while stirring. After standing at room temperature for one week, the bromine is consumed and the mixture evaporated in vacuo. The residue is recrystallized from ethyl acetate-petroleum ether, to yield the 9,10-dibromo-9a-carboxy-4b,9,9a,10-tetrahydro-indeno[1,2-a]indene, melting at 196–200°. The mixture of 3 g. thereof and 25 ml. thionyl chloride is refluxed until dissolution occurs. After standing overnight at room temperature, it is evaporated in vacuo, to yield the corresponding acid chloride.

It is taken up in 25 ml. ethyl acetate, 50 g. ice are added, followed by 5 ml. 25% aqueous dimethylamine while stirring. The precipitate formed is filtered off and recrystallized from ethyl acetate, to yield the 9,10-dibromo-9a-dimethylcarbamoyl - 4b,9,9a,10-tetrahydro-indeno[1,2-a]indene, melting at 235°. The mixture of 5 g. thereof, 25 g. calcium carbonate and 500 ml. methanol is refluxed for 10 days. It is filtered hot, the filtrate concentrated and the precipitate formed filtered off, to yield the 9,10-dimethoxy-9a - dimethylcarbamoyl - 4b,9,9a,10 - tetrahydro-indeno [1,2-a]indene, melting at 210–215°.

Example 11

The solution of 3.5 g. 9,10-dihydroxy-9a-dimethylcarbamoyl-4b,9,9a,10-tetrahydro-indeno[1,2-a]indene in 110 ml. tetrahydrofuran is added dropwise to the mixture of 3.5 g. lithium aluminum hydride in 90 ml. tetrahydrofuran. After refluxing overnight and cooling, 3.5 ml. water, 7 ml. 12% aqueous sodium hydroxide and 10.5 ml. water are added, the mixture filtered and the filtrate evaporated in vacuo. The residue is taken up in diethyl ether, the solution shaken with 5% hydrochloric acid, the aqueous phase made basic with ammonia and extracted with diethyl ether. The extract is dried, concentrated, acidified with 6 N ethanolic hydrogen chloride and the precipitate formed filtered off, to yield the 9,10-dihydroxy-9a-dimethylaminomethyl - 4b,9,9a,10 - tetrahydro-indeno[1,2-a]indene hydrochloride of the formula

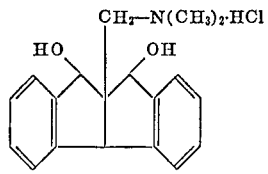

melting at 184–187° (dec.).

The starting material is prepared as follows: The mixture of 12 g. 9,10-dibromo-9a-dimethylcarbamoyl-4b,9, 9a,10-tetrahydro-indeno[1,2-a]indene, 900 ml. acetate and 500 ml. water is refluxed for 3 days and evaporated in vacuo. The residue is recrystallized from acetone, to yield the 9,10 - dihydroxy-9a-dimethylcarbamoyl-4b,9,9a, 10-tetrahydro-indeno[1,2-a]indene, melting at 220–223°.

Example 12

The mixture of 1 g. 5,10-dioxo-4b-(2-diethylaminoethyl)-4b,5,9b,10 - tetrahydro-indeno[2,1-a]indene hydrobromide, 25 ml. glacial acetic acid and 0.5 g. 10% palladium on charcoal is hydrogenated at 3.4 atm. until the theoretical amount of hydrogen has been absorbed. It is filtered, the filtrate evaporated in vacuo and the residue taken up in water. The solution is made basic with ammonia, extracted with diethyl ether, the extract dried, filtered and concentrated, the concentrate acidified with 6 N ethanolic hydrogen chloride and the precipitate filtered off, to yield the 4b-(2-diethylaminoethyl)-4b,5,9b,10-tetrahydro-indeno[2,1-a]indene hydrochloride of the formula

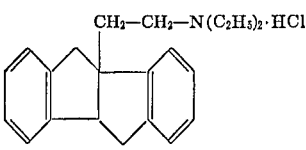

showing in the I.R. spectrum inter-alia bands at 760, 1590 and 2450 cm.$^{-1}$.

In the analogous manner, the 4b-(2-dimethylaminoethyl)-4b,5,9b,10-tetrahydro-indeno[2,1-a]indene hydrochloride is prepared.

The starting material is prepared as follows: To the solution of 3 g. 5,10-dioxo-4b,5,9b,10-tetrahydro-indeno [2,1-a]-indene in 75 ml. tetrahydrofuran, 25 ml. 0.5 N triphenylmethyl lithium in tetrahydrofuran are added dropwise while stirring under nitrogen. (The lithium reagent is prepared by the addition of 1 molar equivalent of 1.6 N n-butyl lithium in hexane to the solution of 7.5 g. triphenylmethane in 25 ml. tetrahydrofuran and 2.5 ml. hexamethyl phosphoric acid triamide while stirring under nitrogen and cooling.) After stirring for 3 hours, the mixture is combined with 13 ml. 2 N 2-diethylaminoethyl chloride in toluene and the mixture refluxed overnight. After cooling, 5 ml. water are added and the mixture concentrated in vacuo to about half of its volume. The concentrate is combined with 100 ml. 20% aqueous sodium hydroxide, the organic phase separated and extracted with 5% hydrochloric acid. The aqueous layer is made basic with sodium hydroxide, extracted with diethyl ether, the extract dried and evaporated. The residue is taken up in isopropanol, the solution acidified with 6.5 N isopropanolic hydrogen bromide and the precipitate formed recrystallized from ethanol, to yield the 9,10-dioxo - 4b - (2-diethylaminoethyl)-4b,5,9b,10-tetrahydro-indeno[2,1-a]indene, melting at 225–230° with decomposition. In the analogous manner, the 5,10-dioxo-4b-(2-dimethylaminoethyl) - 4b,5,9b,10 - tetrahydro-indeno[2, 1-a]indene hydrobromide is prepared; M.P. 265–270°.

Reducing said free compound with lithium aluminum hydride according to Examples 1 or 2 (instead of hydrogenating it), the 5,10-dihydroxy-4b-(2-dimethylaminoethyl)-4b,5,9b,10 - tetrahydro-indeno[2,1-a]indene of the formula

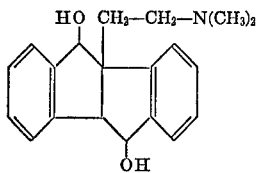

is obtained.

Example 13

Preparation of 10,000 tablets each containing 10.0 mg. of the active ingredient:

| Formula: | G. |
|---|---|
| 9a - dimethylaminomethyl - 4b,9,9a,10-tetrahydro-indeno[1,2-a]indene | 100.00 |
| Lactose | 1,157.00 |
| Corn starch | 75.00 |
| Polyethylene glycol 6,000 | 75.00 |
| Talcum powder | 75.00 |
| Magnesium stearate | 18.00 |
| Purified water q.s. | |

Procedure: All the powders are passed through a screen with openings of 0.6 mm. Then the drug substance, lactose, talcum, magnesium stearate and half of the starch are mixed in a suitable mixer. The other half of the starch is suspended in 40 ml. water and the suspension added to the boiling solution of the polyethylene glycol in 150 ml. water. The paste formed is added to the powders which are granulated, if necessary, with an additional amount of water. The granulate is dried overnight at 35°, broken on a screen with 1.2 mm. openings and compresed into tablets using concave punches with 6.4 mm. diameter, uppers bisected.

I claim:

1. The 1-aminoalkyl-dibenzobicycloalkane of the formula

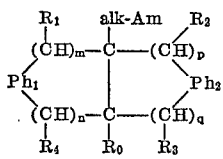

in which each of $Ph_1$ and $Ph_2$ is R-1,2-phenylene, alk is lower alkylene, Am is amino, mono- or di-lower alkylamino, each of R and $R_0$ is hydrogen or lower alkyl, each of $R_1$, $R_2$, $R_3$ and $R_4$ is hydrogen or one or two thereof are hydroxy or lower alkoxy and the others are hydrogen, and each of $m$, $n$, $p$ and $q$ is the integer 1, or one of $m$ and $n$ as well as of $p$ and $q$ is the integer 0 and the others are the integer 1, or the N-oxide or therapeutically acceptable acid addition salts thereof.

2. A compound as claimed in claim 1 and having the formula

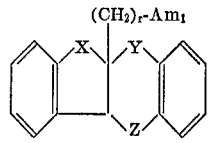

in which $Am_1$ is mono- or di-lower alkylamino, $r$ is the integer 1 or 2, X is methylene, hydroxy- or methoxymethylene and one of Y and Z is X and the other a direct bond or therapeutically acceptable acid addition salts thereof.

3. A compound as claimed in claim 2, in which formula $Am_1$ is methylamino, ethylamino, dimethylamino or diethylamino, $r$ is the integer 1 or 2, each of X and Y are methylene and Z is a direct bond, or therapeutically acceptable acid addition salts thereof.

4. A compound as claimed in claim 2, and being the 9a-methylaminomethyl - 4b,9,9a,10 - tetrahydro-indeno[1,2-a]indene or a therapeutically acceptable acid addition salt thereof.

5. A compound as claimed in claim 2, and being the 9a-dimethylaminomethyl - 4b,9,9a,10 - tetrahydro-indeno[1,2-a]indene or a therapeutically acceptable acid addition salt thereof.

6. A compound as claimed in claim 2, and being the 9a-(2-dimethylaminoethyl) - 4b,9,9a,10 - tetrahydro-indeno[1,2-a]indene or a therapeutically acceptable acid addition salt thereof.

7. A compound as claimed in claim 2, and being the 4b-(2-dimethylaminoethyl) - 4b,5,9b,10 - tetrahydro-indeno[2,1-a]indene or a therapeutically acceptable acid addition salt thereof.

8. A compound as claimed in claim 2, and being the 4b - (2 - diethylaminoethyl) - 4b,5,9b,10 - tetrahydro-indeno[2,1-a]indene or a therapeutically acceptable acid addition salt thereof.

References Cited
UNITED STATES PATENTS
3,489,791  1/1970  Ciganek ........... 260—578 X ROBERT V. HINES, Primary Examiner U.S. Cl. X.R.

260—239 E, B, BA, 243 B, 247, 247.1, 247.2 B, 247.5 B, 247.7 F, 268 PC, 290 R, HL, 293, 293.4 A, 294.3, 294.7, 326.14 T, 326.3, 326.5 C, 326.81, 326.84, 326.85, 327 R, 343.7, 456 P, 465 R, D, 465 E, 469, 471 A, 473 A, 455 CD, 501.1, 501.11, 501.12, 501.18, 501.19, 501.21, 515 R, A, 518 R, 519, 544 M, 556 A, Ar, B, C, 558 R, S, 559 R, T, 562 P, A, 567.5, 567.6 M, 570.8 TC, 570.9, 590, 618, 645 R; 424—246, 248, 250, 251, 263, 266, 267, 274, 280, 329, 330